June 24, 1930.  T. F. BUTZEN ET AL  1,767,169
PISTON
Filed Dec. 30, 1929   2 Sheets-Sheet 1
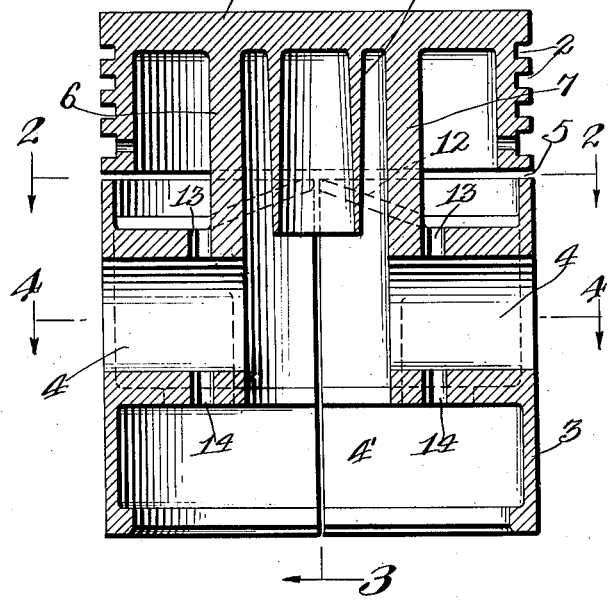
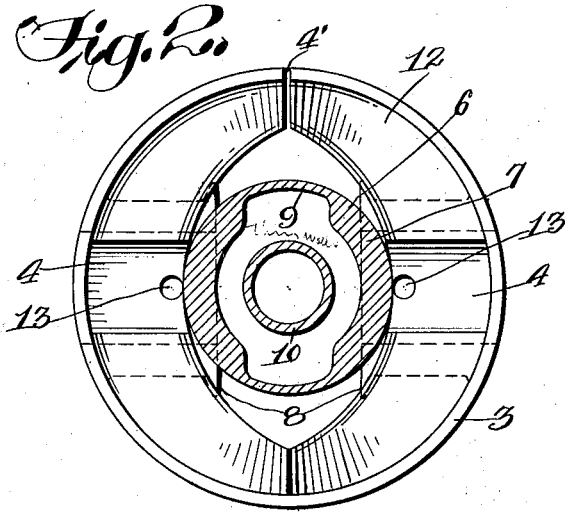
Inventors
Thomas F. Butzen
and Thomas C. Olson
By
Attorneys

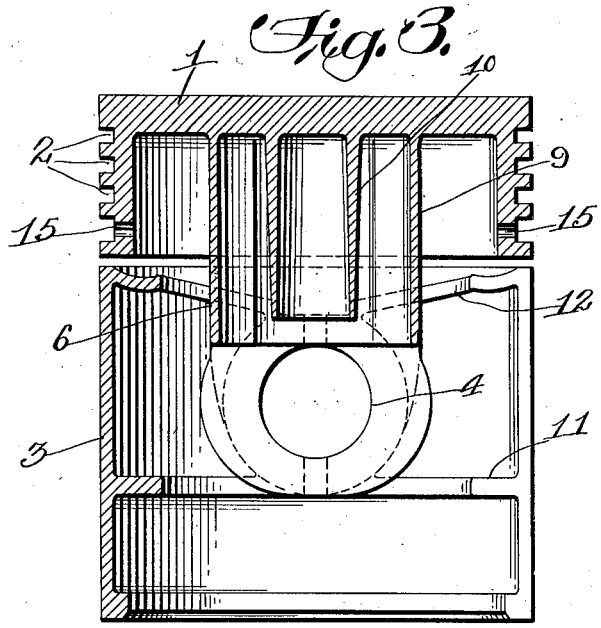
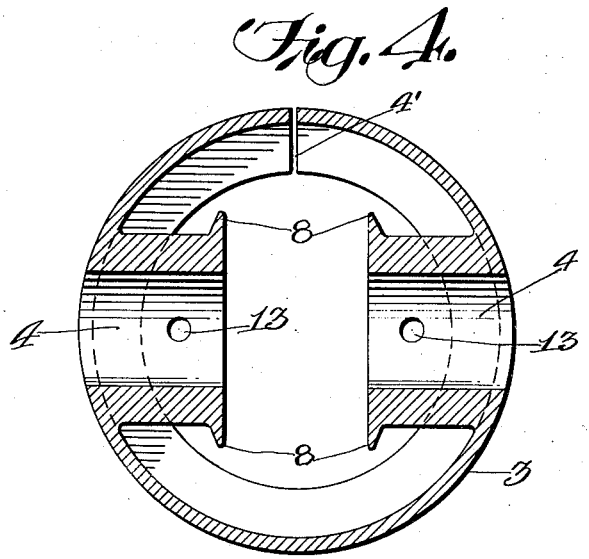

Patented June 24, 1930

1,767,169

UNITED STATES PATENT OFFICE

THOMAS FRANK BUTZEN AND THOMAS C. OLSON, OF MADISON, WISCONSIN

PISTON

Application filed December 30, 1929. Serial No. 417,492.

This invention relates to improvements in the construction of pistons.

One of the objects of our invention is the provision of an improved piston, wherein the construction of the piston is especially adapted for reducing the expansion and contraction with reference to the cylindrical lower part of the piston and to provide in the construction of the piston, means whereby the intense heat from the upper part of the piston will be absorbed to a certain extent and prevents the same from being conveyed to the cylinder part of the piston.

Another object of our invention is the provision of an improved piston wherein the head of the piston which carries the piston rings, is spaced from the cylindrical body part to which the piston rod is connected and suitable connection is provided between the two parts for absorbing a certain amount of the heat created by friction of the reciprocation of the piston in the cylinder, and which is usually taken up by the head of the piston and conveyed to the sleeve or cylindrical part to which the rod is connected, thus reducing to a minimum the amount of heat conveyed from the head of the piston to the skirt or sleeve part.

A further object of the invention is the provision of an improved piston which can be readily cast in aluminum or other similar material and the relative arrangement of the parts is such as to convey and absorb the heat from the head of the piston so as to prevent this heat from being conveyed to the skirt or cylindrical part of the same.

With the above and other objects in view, the invention consists in the novel features of construction, the combination and arrangement of parts hereinafter more fully set forth, pointed out in the claims and shown in the accompanying drawings wherein:

Figure 1 is a longitudinal sectional view through our improved piston;

Figure 2 is a transverse section on the line 2—2 of Figure 1;

Figure 3 is a longitudinal section on the line 3—3 of Figure 1;

Figure 4 is a transverse section on the line 4—4 of Figure 1.

Referring more particularly to the drawings, 1 indicates the head portion of the piston provided with the usual annular grooves 2 which are adapted to receive the well known piston rings.

The skirt or sleeve portion 3 of the piston is split longitudinally, as shown at 4, to provide for proper expansion and contraction of this portion of the cylinder. The skirt portion 3 is provided with the usual bearing sleeves 4 which receive the usual wrist pin of a piston.

The head 1 and skirt 3 are spaced from each other, as illustrated at 5, so that these two parts are not in intimate contact, which will prevent the heat absorbed by the head 1 from being conveyed to the skirt portion of the piston. The head 1 and skirt 3, however, are integrally connected by means of the substantially circular-shaped sleeve 6, the walls of which are comparatively thick on one side, as shown at 7 to form a substantially rigid connection between the skirt and the head 1.

This connection between the skirt and head is preferably made between the intermediate portion of the head and the bearing sleeves 4, carried by the skirt so that the bearing sleeves, together with the relatively thick portion 7, will have a tendency to absorb and radiate the greater portion of the heat from the head 1 before it reaches the bearing sleeves 4, or is carried on into the skirt portion 3. The inner ends of the sleeves 4 are provided with lateral flanges 8 which also have a tendency to absorb and radiate off a proportionate amount of the heat conveyed from the piston body 1.

The side portions of the sleeve 6, opposite the comparatively thick parts 7 are relatively thin, as shown at 9 and these thin portions 9 will also convey a considerable amount of heat from the body 1 and have a tendency to radiate this heat upon the interior of the piston.

In addition to the sleeve 6, we provide a centrally arranged sleeve 10 which is positioned within the sleeve 6 and extends inwardly into the body of the piston beyond the space 5 and preferably adjacent the inner side walls of the sleeves 4, as clearly illustrated in Figures 1 and 3. This sleeve 10 forms additional means for conveying the heat from the head portion 1, downwardly into the body of the cylinder where it will, through the movement of the piston, be conveyed out around the piston rod.

The interior of the skirt portion 3 is provided with an inwardly extending flange 11 which extends around upon the interior of the skirt at the lower side portion of the sleeves 4, and the skirt 3 is further provided with a flange 12 having diametric points thereof leading into the inlet apertures 13 which communicate with the interior of the wrist pin sleeves 4, whereby the oil which will be scraped off the sides of the cylinders by the edge of the sleeve will pass inwardly through the space 5 and on to the flange 12, where, due to the inclination of the flange 12 this oil will be conveyed downwardly into the inlet apertures 13.

The wrist pin sleeves 4 are provided with outlet apertures 14, whereby the lubricating oil after being passed around the wrist pins will pass outwardly and back toward the crank case. The piston head 1 is also provided with oppositely disposed lubricating apertures 15 and the lubricant which passes inwardly to the interior of the piston through the apertures 15 will drop downwardly on to the inclined portions of the flange 12 and be conveyed to the apertures 13. It will be noted that the high points of flange 12 are arranged respectively at the inner termination of the slit 4' and at a diametric point on the skirt so that the lowest points of the flange 12 will be disposed directly in alignment with the apertures 13 so as to assure a positive conveyance of the lubricating fluid to these apertures.

It will be apparent from the foregoing construction, that by connecting the head portion 1 and the bearing sleeves 4 by the sleeve 6, the heat which is usually generated by the movement of the piston in the cylinder will be conveyed from the head into the interior of the piston and by providing the substantially cylindrical sleeve 10, a greater amount of heat can be conveyed from the head 1 to the interior of the cylinder, thus practically eliminating or reducing to a minimum the conveyance of heat from the head to the cylinder to the skirt portion which will reduce to a minimum, the expansion and contraction of the body of the cylinder.

As a great deal of difficulty has been experienced in the over expansion of pistons, causing them to stick within the cylinders, which is particularly due to the over heating of the piston, and it is believed that a piston constructed in accordance with the above will reduce to a minimum the difficulties referred to, and as the construction to the piston is comparatively simple, the same can be manufactured and placed on the market at a very low cost and will increase the efficiency of all volatile fluid motors.

While we have shown and described the preferred embodiment of our invention, it will be apparent that slight changes may be made in the construction when putting the invention into practice without departing from the spirit of the same or the scope of the appended claims.

We claim:

1. In a piston, in combination, a head, a skirt spaced from the head, bearing sleeves carried by the skirt, an oval-shaped sleeve connecting the head with the bearing sleeves and said oval-shaped sleeve having opposed thick side walls and opposed thin side walls.

2. In a piston, a head, a skirt, bearing sleeves carried by said skirt, an oval-shaped sleeve connecting the head and bearing sleeves and a centrally disposed sleeve depending from the head in the oval-shaped sleeve.

3. In a piston, a head, a skirt spaced from the head, bearing sleeves carried by the skirt, a sleeve connecting the head with the bearing sleeves, and a centrally disposed dependent sleeve carried by the head within the first sleeve extending therefrom.

4. In a piston, a head, a skirt spaced from the head, bushing sleeves carried by the skirt, a sleeve depending from the head and connected with the bushing sleeves, and a depending sleeve arranged centrally of the last mentioned sleeve and depending from the head.

5. In a piston, a head, a skirt spaced therefrom, opposed bushing sleeves carried by the skirt, a conductive sleeve depending from the head and having comparatively thick side walls and opposed thin walls, and a centrally conductive sleeve depending from the head to a point adjacent the bushing sleeves.

6. In a piston, a head, a skirt spaced from the head, bushing sleeves carried by the skirt and having receiving apertures, an inwardly extending flange on the skirt inclined toward the receiving apertures, and a sleeve depending from the head and connected with the bushing sleeves.

In testimony that we claim the foregoing we have hereunto set our hands at Madison, in the county of Dane and State of Wisconsin.

THOMAS FRANK BUTZEN.
THOMAS C. OLSON.